United States Patent Office 3,573,107
Patented Mar. 30, 1971

3,573,107
METHOD OF MANUFACTURE OF SOLID
ELECTROLYTES FOR FUEL CELLS
René A. Pâris, Lyon, and Guy Pâris, Le Harve, Seine-Maritime, France, assignors to Societe Anonyme dite: Compagnie Francaise de Raffinage, Paris, France
No Drawing. Filed Dec. 20, 1968, Ser. No. 785,763
Claims priority, application France, Dec. 20, 1967, 133,189
Int. Cl. H01m 11/00
U.S. Cl. 136—153
16 Claims

ABSTRACT OF THE DISCLOSURE

A method of preparing of solid electrolytes for fuel cells based on zirconia stabilized in the cubic phase, which consists of first preparing an intimate mixture or a mixed complex of organic zirconyl salts and salts of stabilizing metals, decomposing said salts by pyrolysis between 300° and 950° C. and preferably between 300° and 450° C., and bringing the pyrolysis products up to a temperature between 900° and 1100° C. to crystallize said solid solution at a sufficient size of grain, and then projecting said solid solution in a flame at a suitable granular size, on to a support constituted by a porous ceramic material or by a porous metal to deposit a thin layer of electrolyte on said support.

The zirconyl salts and the salts of the other stabilizing metals are salts of carboxylic acids (formates, acetates, etc.) or of polyhydroxy-carboxilic acid (tartrates, citrates, mandelates, etc.).

The present invention relates to a method for preparing solid electrolytes for fuel cells based on zirconia stabilized in its crystalline cubic phase.

It is known that pure zirconia is only obtained in the cubic crystalline form of the fluorine type at very high temperatures (above 2200° C.) and that it cannot be maintained in this form, even by abrupt hardening, at lower temperatures. On the other hand, when it contains, in solid solution, certain oxides of bivalent or trivalent metals in suitable proportions, the zirconia retains its cubic system over a very large range of temperatures and sometimes in a very durable manner.

Such solid cubic solutions have good electrical conductivity of the ionic type, whereas the conductivity of the electronic type is very low. These ionic conductors constituted by stabilized cubic zirconia can be utilized as solid electrolytes for fuel cells operating at high temperature, and these electrolytes are obviously even better if they have a higher conductivity which is more unaffected by prolonged maintenance at the working temperature of the cell.

Electrolytes for fuel cells have especially been produced by stabilizing zirconia with lime, a mixture of lime and magnesia, or with oxides of rare earth metal. Among these, yttrium oxide is the most frequently employed, but we have already described in previous patents, solid electrolytes for fuel cells prepared by stabilizing zirconia by one or more oxides of the rare earth metals, the atomic numbers of which range from 62 to 71. We have also described stabilized cubic zirconia formed by solid ternary, quaternary solutions, or those of a higher order, comprising at the same time lime and one or more oxides of rare earth metals, the atomic number of which fall within the range of 59 to 71.

Up to the present time, the known methods for the preparation of an electrolyte necessarily included sintering of the oxides (zirconia+stabilizers) at a high temperature, on the order of 1800° C., in order to obtain a solid homogeneous solution.

The best known method consisted of mixing powders of zirconia and of the stabilizing oxide or oxides, grinding them finely and sintering them at high temperature for several hours, after compression in a mold which has the form of the desired electrolyte.

By means of the addition of a quantity of alumina at most equal to 10 mol percent, the powder may be sintered at lower temperatures, but never below 1400° C.

In place of the moulding technique, a more recent method for putting the electrolyte into shape consists of first preparing the solid solution of the oxides in the zirconia by sintering the mixtures of powders at high temperature, then reducing by grinding the resulting sinter to a uniform granular size, and then projecting it with a flame on a porous support, either of non-conductive refractory material, or of porous metal, so as to form a layer of electrolyte which is as thin as possible in order to reduce its electrical resistance to a minimum value.

In this latter method, there is also an advantage in reducing the sintering temperature by adding alumina to the mixture of powders, but it is still true that the preparation of the solid solution which will form the electrolyte implies a prolonged treatment of the powders of oxides at a temperature of at least 1400° C. in order that these oxides may be dissolved in the other.

The present invention has for its object to provide an economic method of preparing solid electrolytes for fuel cells based on stabilized zirconia, which method avoids the sintering operations. It has also the object of providing a method of preparation of these electrolytes which gives them good mechanical properties and high ionic conductivity.

Other objects of the invention will be apparent from the description which follows and which will illustrate the usefulness of the invention.

We have observed the non-obvious fact, that instead of utilizing as the starting product in the projection by flame of a solid solution of stabilized zirconia prepared by sintering as in the prior art, it is possible, without modifying the final result, to utilize as the product to be projected a stabilized zirconia obtained at low temperature by pyrolysis of the appropriate compounds.

The invention has therefore for its object a method of preparation of solid electrolytes for fuel cells which consists of first preparing an intimate mixture or mixed complex more or less well crystallized (or even amorphous) of organic salts of zirconyl and stabilizing metals, decomposing these salts by pyrolysis between 300° and 950° C., preferably between 300° and 450° C. bringing the pyrolysis product thus obtained in the amorphous form to a temperature between 900 and 1100° C. to cause the solid solution to crystallize to a sufficient grain size, and then projecting in a flame the said solid solution brought to a suitable granular size, on to a support constituted by a porous ceramic material or a porous metal, to form on said support a thin layer of electrolyte.

In order to obtain the intimate mixture or the mixed complex of organic salts, solutions of each of the salts are mixed together in proportions such that the final solution obtained comprises the cations of zirconium and other metallic elements in the ratio in which they must be present in the final solid solution of stabilized zirconia.

This solution is then concentrated by evaporation, while hot or under vacuum, depending on the case, and leaves, during the course of this operation an intimate mixture or a mixed complex more or less well crystallized, of organic salts.

Amongst the salts which can be utilized in the present invention, there will preferably be selected the salts of carboxylic acids (formic, acetic, etc.) or poly-hydroxy-carboxylic acids, tartaric, citric, mandelic, etc.). In the case of zirconyl formate, which is not soluble in water but which is soluble in dilute hot formic acid, there will be employed an excess of formic acid so as to completely dissolve all the salts, including the zirconyl formate.

The following examples, which are not limitative in nature, are given by way of illustration of the method of the invention, and are particularly intended to define the operating process followed. They show that the general method described in the present invention must be adapted to each type of organic salt considered, and that the products subjected to pyrolysis may be presented differently according to the case.

Other alternative forms of the method of obtaining the products subjected to pyrolysis can readily be imagined, but we have intended to indicate, in the examples below, the operating details which have made it possible for us to obtain, amongst many other possibilities, the best results which those skilled in the art will be able to reproduce without difficulty.

EXAMPLE I

Zirconyl acetate is prepared by treating with acetic acid a zirconium carbonate, which is in turn obtained by mixing together solutions of sodium carbonate and zirconyl chloride. The zirconyl acetate is isolated in the form of a white powder by precipitating it from its aqueous solution by acetone at ordinary temperature. Its general formula is $ZrO(COOCH_3)_2 3.5H_2O$. It is soluble in water, but it is desirable to keep in solution in dilute acetic acid in order to prevent any hydrolysis. On the other hand, samarium acetate is prepared by dissolving the oxide $Sm_2O_3$ in nitric acid and then adding acetic anhydride by small portions; the reduction reaction is started by a slight heating to 50° C. When the liberation of nitrous vapors is completed, there is added an excess of acetic anhydride, from which is precipitated the samarium acetate. This salt has the formula

$Sm(COOCH_3)_3 2H_2O$ and is soluble in water. A preparation which is equivalent to that above consists of dissolving $Sm_2O_3$ in acetic acid while hot and precipitating the desired acetate by means of acetone.

Two aqueous solutions are mixed together, one of zirconyl acetate slightly acidified by acetic acid, the other of samarium acetate, in proportions such that the ratio Sm/Zr, expressed as a molecular percentage, corresponds to 10% $Sm_2O_3$ and 90% of $ZrO_2$.

This acetate solution is evaporated at 70–80° C. in a sand bath and there is thus obtained an intimate mixture of small crystals of the two acetates. The latter are pyrolyzed by gradual heating to 450° C. and are then brought rapidly up to 1000 to 1100° C. in a furnace to crystallize the solid solution $ZrO_2$-$Sm_2O_3$ and bring it to a size of crystalline grain such that after a slight grinding to break it up, it has a granular size which enables it to be readily poured out and fed without sticking to a plasma torch. This powder is then projected in the flame of the plasma torch on to the support which is to be covered with electrolyte and, under these conditions, there is deposited a thin homogeneous layer of stabilized zirconia with samarium and having a stable cubic structure.

EXAMPLE II

Zirconyl formate is prepared by adding pure formic acid in small quantities to a clear solution of zirconium nitrate; the reduction reaction of the nitrate, started by means of slight heating, is shown by an abundant liberation of nitrous vapors. The addition of formic acid is continued until the nitrate is completely reduced, by maintaining at the end of the operation a heating at about 90° C. As soon as the formic acid is in excess, a white precipitate forms. This is filtered when cold, washed with pure formic acid and acetone and is then dried. Its formula is $ZrO(COOH)_2 nH_2O$ where $n$ is greater than 1 and less than 2. It is very slightly soluble in water, which furthermore causes it to be hydrolyzed. It dissolves much better in dilute (10%) and hot formic acid.

On the other hand, ytterium formate is prepared by dissolving the oxide $Yb_2O_3$ in nitric acid and then adding formic acid in small portions to this nitric solution. The reduction reaction is started by a slight heating to 50° C. When the last traces of nitrous vapors have disappeared, there is precipitated by acetone a formate having the formula $Yb(COOH)_3 2H_2O$.

There are then mixed together two aqueous solutions, one of zirconyl formate acidified to 10% by formic acid and the other of ytterbium formate, in proportions such that the ratio Yb/Zr, expressed as a molecular percentage, corresponds to 10% $Yb_2O_3$ and 90% of $ZrO_2$.

This formate solution is evaporated at 70–80° C. in a sand bath and there is thus obtained a deposit of a mixed formate of zirconyl and ytterbium, amorphous according to radio-crystallographic analysis, and which, when it is subjected to pyrolysis, behaves quite differently from the mixture of the formate of zirconyl and the formate of ytterbium. In fact, this latter gives by pyrolysis a mixture of monoclinic zirconia and ytterbium oxide, absolutely distinct and characterized by radio-crystallographic analysis, to the exclusion of any other phase, while the mixed formate of zirconyl and ytterbium, prepared under the conditions indicated above by the evaporation of the solution of the two formates, gives directly by pyrolysis the solid cubic solution $ZrO_2$-$Yb_2O_3$, to the exclusion of any individual oxide.

This pyrolysis of the mixed formate is effected by gradually heating this solid to 450° C., followed by maintenance in a furnace at 1000–1100° C., intended to bring the solid cubic solution to its desired granular size. The utilization of this powder of the cubic solution $ZrO_2$-$Yb_2O_3$ constituting a solid electrolyte, is then carried out in the manner described in Example I for the solid solution $ZrO_2$-$Sm_2O_3$, by means of projection in the flame of a plasma torch.

EXAMPLE III

For the purpose of obtaining a solid electrolyte constituted by a solid cubic solution of zirconia stabilized by oxides of dysprosium, erbium and ytterbium, there is effected the pyrolysis of a mixed citrate prepared in the following manner.

There is first prepared a citrato-zirconate of ammonium $(NH_4)_2 ZrOC_6H_4O_7$ by dissolving in water, while hot, zirconium nitrate and citric acid in equi-molecular proportions. The solution is brought to a pH of 3.5–4 by adding concentrated ammonia. An addition of ethanol to this solution causes a precipitation of bulky flakes of ammonium citrato-zirconate, which are easy to filter.

On the other hand, citrates are prepared of each of the lanthanides which will have to be introduced into the zirconia, that is to say those of dysprosium, erbium and ytterbium, by dissolving the oxide of the rare earth metal in nitric acid and precipitating this solution with an ammonical solution of ammonum citrate so as to have a final pH of 4 to 4.5. The ratio of metal/citrate in this preparation is chosen to be one. By causing this solution to crystallize by evaporation, there are obtained hydrated crystals having the formula $LnC_6H_5O_7$, $xH_2O$, in which Ln designates the lanthanide and $x$ is the number of molecules of water, varying from 3.5 to 6, depending on the lanthanide considered.

From starting compounds of this kind, there is prepared a solid solution of oxides of lanthanides in zirconia, by starting with the solution in hot water, with agitation and in the presence of diammonium citrate, of ammonium citrato-zirconate and the various citrates of rare earth metals, in proportions such that there is obtained a final solid solution having the molar composition: 90% $ZrO_2$, 4% $Dy_2O_3$, 3% $Er_2O_3$, 3% $Yb_2O_3$. The quantity of diammonium citrate which is added must be such that the final solution contains two molecules of citrate per atom of metal, it being understood that by "metal" is intended to mean the total metal: $Zr+Dy+Er+Yb$.

By evaporating this solution completely by heating, without special precautions, there is obtained a very homogeneous vitreous solid which represents a mixed citrate of zirconium and rare earth metals. After grinding, this solid is put into a furnace in which it is brought up to 900° C. Under these conditions, the pyrolysis is terminated in a few minutes, and there is thus obtained a homogeneous cubic solid solution of the oxides of rare earth metals in zirconia, and the composition of which corresponds to that of the initial solution. By means of subsequent heating to 1000-1100° C., the desired crystalline grain is obtained, after which the solid is projected in the flame of a plasma torch, as described in Example I, so as to cover a porous support with a thin layer of this solid electrolyte.

EXAMPLE IV

With the object of obtaining a solid electrolyte constituted by a solid cubic solution of zirconia stabilized by the oxides of dysprosium, erbium, ytterbium and yttrium, there is carried out the pyrolysis of a mixed citrate prepared in the following manner.

Ammonium citrato-zirconate is first prepared in the manner indicated in Example III.

On the other hand, there is prepared a mixed citrate of the rare earth metals considered, by dissolving in nitric acid a mixed oxide comprising the different rare earth metals and having the following molar composition: 37.5% of $Dy_2O_3$, 18.75% $Er_2O_3$, 18.75% $Yb_2O_3$, 25% of $Y_2O_3$, and then precipitating this solution by an ammonical solution of ammonium nitrate, so as to obtain a final pH of 4 to 4.5, and by providing that the metal/citrate ratio is maintained at 1. There are thus obtained hydrated crystals having the formula $Ln(C_6H_5O_7)4H_2O$, in which Ln represents the sum of the lanthanides considered.

From starting compounds of this kind, there is prepared a solid solution of oxides of lanthanides in zirconia, by starting with the solution in hot water, under agitation and in the presence of diammonium citrate, of ammonium citrato-zirconate and the mixed citrate of rare earths $Ln(C_6H_5O_7)4H_2O$ in a proportion such that in the final solid solution there are 92 mols percent of $ZrO_2$ and 8 mols percent of $Ln_2O_3$, the quantity of di-ammonium citrate added being such that the final solution contains two molecules of citrate per atom of metal $(Zr+Ln)$. By evaporating this solution to dryness by heating, without special precautions, there is obtained a very homogeneous vitreous solid constituted by a mixed citrate of zirconium and rare earth metals. After grinding, this solid is conveyed to a furnace in which it is brought up to 900° C.; under these conditions, the pyrolysis is completed in a few minutes and there is thus obtained a homogeneous cubic solid solution having the molar composition: 92% $ZrO_2$, 3% $Dy_2O_3$, 1.5% $Er_2O_3$, 1.5% $Yb_2O_3$, and 2% $Y_2O_3$.

Subsequent heating to 1000-1100° C. gives the desired crystalline grain to this solid solution, and it is only necessary to project it in the flame of a plasma-torch, as described in Example I, so as to cover a porous support with a thin layer of this solid electrolyte.

What we claim is:

1. A method for preparing solid electrolytes for fuel cells based on zirconia stabilized in the cubic phase, said method comprising: preparing an intimate mixture of organic zirconyl salts and salts of stabilizing metals; preparing a solid solution by decomposing said salts by pyrolysis between 300 and 950° C. and crystallizing the product thus obtained at a temperature between 900° and 1100° C.; and then projecting said solid solution by a flame on to a support constituted by a porous ceramic material to deposit a thin layer of electrolyte on said support.

2. A method for preparing solid electrolytes for fuel cells based on zirconia stabilized in the cubic phase, said method comprising: preparing an intimate mixture of organic zirconyl salts and salts of stabilizing metals; preparing a solid solution by decomposing said salts by pyrolysis between 300° and 950° C. and crystallizing the product thus obtained at a temperature between 900° and 1100° C.; and then projecting said solid solution by a flame on to a support constituted by a porous metal to deposit a thin layer of electrolyte on said support.

3. A method for preparing solid electrolytes for fuel cells based on zirconia stabilized in the cubic phase, said method comprising: preparing a mixed complex of organic zirconyl salts and salts of stabilizing metals; preparing a solid solution by decomposing said salts by pyrolysis between 300° and 950° C. and crystallizing the product thus obtained at a temperature between 900° and 1100° C.; and then projecting said solid solution by a flame on to a support constituted by a porous ceramic material to deposit a thin layer of electrolyte on said support.

4. A method for preparing solid electrolytes for fuel cells based on zirconia stabilized in the cubic phase, said method comprising: preparing a mixed complex of organic zirconyl salts and salts of stabilizing metals; decomposing said salts by pyrolysis between 300° and 950° C., and crystallizing the product thus obtained at a temperature between 900° and 1100° C.; and then projecting said solid solution by a flame on to a support constituted by a porous metal to deposit a thin layer of electrolyte on said support.

5. A method as claimed in claim 1, in which said intimate mixture of organic salts is obtained by mixing solutions of each of said salts in proportions such that the final solution obtained includes the cations of zirconium and other metallic elements in the ratio in which they must be present in the final solid solution of stabilized zirconia, and then concentrating said solution by evaporation.

6. A method as claimed in claim 3, in which said mixed complex of organic salts is obtained by mixing solutions of each of said salts in proportions such that the final solution obtained includes the cations of zirconium and other metallic elements in the ratio in which they must be present in the final solid solution of stabilized zirconia, and then concentrating said solution by evaporation.

7. A method as claimed in claim 1, in which said pyrolysis is effected between 300° and 450° C.

8. A method as claimed in claim 1 in which said zirconyl salts and the other stabilizing metal salts are salts of carboxylic acids.

9. A method as claimed in claim 8, in which said salts are formates.

10. A method as claimed in claim 8, in which said salts are acetates.

11. A method as claimed in claim 1, in which said salts are salts of poly-hydroxy-carboxylic acid.

12. A method as claimed in claim 11, in which said salts are tartrates.

13. A method as claimed in claim 11, in which said salts are citrates.

14. A method as claimed in claim 11, in which said salts are mandelates.

15. A method as claimed in claim 2 in which said intimate mixture of organic salts is obtained by mixing solutions of each said salts in proportions such that the final solution obtained includes the cations of zirconium and other metallic elements in the ratio in which they must be present in the final solid solution of stabilized zirconia, and then concentrating said solution by evaporation.

16. A method as claimed in claim 4 in which said mixed complex of organic salts is obtained by mixing solutions of each of said salts in proportions such that the final solution obtained includes the cations of zirconium and other metallic elements in the ratio in which they must be present in the final solid solution of stabilized zirconia, and then concentrating said solution by evaporation.

References Cited

UNITED STATES PATENTS

| | | | |
|---|---|---|---|
| 3,300,344 | 1/1967 | Bray et al. | 136—86 |
| 3,350,230 | 10/1967 | Tannenberger et al. | 136—153X |
| 3,432,314 | 3/1969 | Mazdiyasni et al. | 106—57 |
| 3,421,948 | 1/1969 | Arrance et al. | 136—146 |
| 3,489,610 | 1/1970 | Berger et al. | 136—153X |

WINSTON A. DOUGLAS, Primary Examiner

A. SKAPARS, Assistant Examiner

U.S. Cl. X.R.

136—86; 106—57; 252—520